United States Patent
Hsieh et al.

(10) Patent No.: US 11,284,359 B2
(45) Date of Patent: Mar. 22, 2022

(54) UPLINK POWER CONTROL AND TIME-DIVISION MULTIPLEXING PATTERNS FOR DUAL ACTIVE PROTOCOL STACK BASED HANDOVER

(71) Applicant: MEDIATEK INC., Hsinchu (TW)

(72) Inventors: Chi-Hsuan Hsieh, Hsinchu (TW); Wei-De Wu, Hsinchu (TW)

(73) Assignee: MEDIATEK INC., Hsinchu (JP)

( * ) Notice: Subject to any disclaimer, the term of this patent is extended or adjusted under 35 U.S.C. 154(b) by 0 days.

(21) Appl. No.: 16/832,935

(22) Filed: Mar. 27, 2020

(65) Prior Publication Data

US 2020/0314773 A1 Oct. 1, 2020

Related U.S. Application Data

(60) Provisional application No. 62/826,113, filed on Mar. 29, 2019, provisional application No. 62/888,119, filed on Aug. 16, 2019.

(51) Int. Cl.
*H04W 52/40* (2009.01)
*H04W 36/08* (2009.01)
(Continued)

(52) U.S. Cl.
CPC ........... *H04W 52/40* (2013.01); *H04W 36/08* (2013.01); *H04W 36/18* (2013.01); *H04W 52/146* (2013.01); *H04W 52/367* (2013.01)

(58) Field of Classification Search
CPC . H04W 52/40; H04W 52/146; H04W 52/367; H04W 36/08; H04W 36/18
(Continued)

(56) References Cited

U.S. PATENT DOCUMENTS

2010/0246463 A1  9/2010  Papasakellariou et al.
2011/0039561 A1* 2/2011  Narasimha .......... H04W 52/146
                                            455/436
(Continued)

FOREIGN PATENT DOCUMENTS

CN      1728585 A      2/2006
CN    104519561 A      4/2015
CN    108811151 B  * 11/2018  ........ H04W 72/1242

OTHER PUBLICATIONS

International Search Report and Written Opinion dated Jun. 30, 2020 in PCT/CN2020/082003, 9 pages.
(Continued)

*Primary Examiner* — Mong-Thuy T Tran
(74) *Attorney, Agent, or Firm* — Oblon, McClelland, Maier & Neustadt, L.L.P.

(57) ABSTRACT

Aspects of the disclosure further provide various apparatuses and methods for wireless communications. One apparatus includes processing circuitry that can determine a first transmission power for a first uplink transmission associated with the source cell and a second transmission power for a second uplink transmission associated with the target cell. When the first uplink transmission and the second uplink transmission overlap in time domain and a total power of the first transmission power and the second transmission power is above a first threshold, the processing circuitry reduces the first transmission power for the first uplink transmission to a third transmission power so that a total power of the second transmission power and the third transmission power is equal to or less than the first threshold. The processing circuitry performs the first uplink transmission at the third transmission power and the second uplink transmission at the second transmission power.

17 Claims, 5 Drawing Sheets

(51) Int. Cl.
  *H04W 52/36* (2009.01)
  *H04W 52/14* (2009.01)
  *H04W 36/18* (2009.01)

(58) Field of Classification Search
  USPC .......................................................... 455/442
  See application file for complete search history.

(56) References Cited

U.S. PATENT DOCUMENTS

| | | |
|---|---|---|
| 2013/0040675 A1* | 2/2013 | Ant ..................... H04W 52/226 455/509 |
| 2015/0117384 A1 | 4/2015 | Papasakellariou et al. |
| 2015/0230189 A1 | 8/2015 | Chen |
| 2016/0014702 A1 | 1/2016 | Papasakellariou et al. |
| 2016/0212712 A1 | 7/2016 | Chen et al. |
| 2017/0105179 A1* | 4/2017 | Kusashima ........... H04W 52/16 |
| 2018/0027466 A1* | 1/2018 | Trott ................ H04W 36/0079 455/437 |
| 2020/0374813 A1* | 11/2020 | Feng ....................... H04W 8/24 |
| 2021/0144715 A1* | 5/2021 | Gotoh ................... H04L 1/0004 |
| 2021/0258889 A1* | 8/2021 | Zhang ................. H04W 52/247 |

OTHER PUBLICATIONS

Combined Taiwanese Office Action and Search Report dated Nov. 27, 2020 in Taiwanese Patent Application No. 109110755 (with English translation of Category of Cited Documents), 7 pages.

* cited by examiner

| Step | Description | Time (ms) |
|---|---|---|
| S201 | RRC Reconfiguration | 10 |
| S202 | SN Status Transfer | 0 |
| S203.1 | Target Cell Search | 0 |
| S203.2 | UE processing time for RF/basedband re-tuning, security update | 20/40 |
| S203.3 | Delay to acquire first available PRACH in target cell | 10 (10+10*x) |
| S203.4 | PRACH preamble transmission | 1 |
| S203.5 | Fine time tracking and acquiring full timing information | 5/10 (SMTC periodicity) |
| S204 | UL Allocation + TA for UE | 3/5 |
| S205 | UE sends RRC Connection Reconfiguration Complete | 6 |
| | Minimum / Typical Total Delay | 55ms/82ms |

UPLINK POWER CONTROL AND TIME-DIVISION MULTIPLEXING PATTERNS FOR DUAL ACTIVE PROTOCOL STACK BASED HANDOVER

INCORPORATION BY REFERENCE

This present application claims the benefits of U.S. Provisional Application No. 62/826,113, "DESIGN OF UL POWER CONTROL AND TDM TERNS FOR DC UE CAPABLE OF DYNAMIC POWER-SHARING FOR SIMULTANEOUS TX DURING DC-BASED HANDOVER" filed on Mar. 29, 2019, and U.S. Provisional Application No. 62/888,119, "UL POWER CONTROL AND SINGLE UPLINK OPERATION CONTROL DURING DC-BASED HO" filed on Aug. 16, 2019. The entire disclosures of the prior applications are hereby incorporated by reference in their entirety.

TECHNICAL FIELD

The present disclosure relates to wireless communications, and specifically relates to dual active protocol stack (DAPS) based handover (HO).

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

In wireless system, a user equipment (UE), such as a cellular phone, may need to switch from one network (e.g., a source cell) to another network (e.g., a target cell). This procedure can be referred to as handover (HO). In 3GPP Release 16, it is agreed to adopt the dual active protocol stack (DAPS) based handover (HO) to achieve as close as possible to 0 ms interruption time.

In addition, in 3GPP Release 12, dual connectivity (DC) architecture is introduced to increase throughput for the UE. This architecture allows the UE to utilize radio resources of two nodes: master node (MN) and secondary node (SN). During the DAPS based HO procedure, the UE can apply DC to the source cell that may serve as the MN and the target cell that may serve as the SN. In some cases, the UE may not release the source cell connection until the target cell connection is constructed. That is, the UE may need to maintain connection with both the source and target cells. Therefore, it is possible that the UE needs to perform uplink (UL) transmission towards both the source and target cells at the same time with the same radio resource. However, in common DC scenario, the source cell can be in a master cell group (MCG) and the target cell can be in a secondary cell group (SCG), and transmission power at which the UE performs communications with the MCG is prioritized over transmission power at Which the UE performs communications with the SCG.

SUMMARY

Aspects of the disclosure provide an apparatus for wireless communications. The apparatus includes processing circuitry that can determine a first transmission power for a first uplink transmission associated with the source cell and a second transmission power for a second uplink transmission associated with the target cell. When the first uplink transmission and the second uplink transmission overlap in time domain and a total power of the first transmission power and the second transmission power is above a first threshold, the processing circuitry reduces the first transmission power for the first uplink transmission to a third transmission power so that a total power of the second transmission power and the third transmission power is equal to or less than the first threshold. The processing circuitry performs the first uplink transmission at the third transmission power and the second uplink transmission at the second transmission power.

In an embodiment, the processing circuitry can drop the first uplink transmission associated with the source cell when a difference between the second transmission power and the third transmission power is above a second threshold.

Further, the processing circuitry can drop the first uplink transmission associated with the source cell when the first uplink transmission and the second uplink transmission overlap in the time domain and frequency domain.

In an embodiment, the processing circuitry performs the first uplink transmission at the first transmission power and the second uplink transmission at the second uplink transmission power through different time resources so that the first uplink transmission and the second uplink transmission do not overlap in the time domain.

In an embodiment, the source cell is in a source master cell group (MCG) and the target cell is in a target MCG.

In an embodiment, the processing circuitry performs dual active protocol stack (DAPS) based handover (HO). Further, the processing circuitry drops the first uplink transmission associated with the source cell when the UE indicates that simultaneous uplink transmission to the source cell and the target cell is not supported.

Aspects of the disclosure provide a method for wireless communications. Under the method, a first transmission power for a first uplink transmission associated with the source cell and a second transmission power for a second uplink transmission associated with the target cell are determined. When the first uplink transmission and the second uplink transmission overlap in time domain and a total power of the first transmission power and the second transmission power is above a first threshold, the first transmission power for the first uplink transmission to a third transmission power is reduced so that a total power of the second transmission power and the third transmission power is equal to or less than the first threshold. The first uplink transmission is performed at the third transmission power and the second uplink transmission is performed at the second transmission power.

Aspects of the disclosure further provide a non-transitory computer-readable medium which stores instructions implementing any one or a combination of the above methods for wireless communication.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
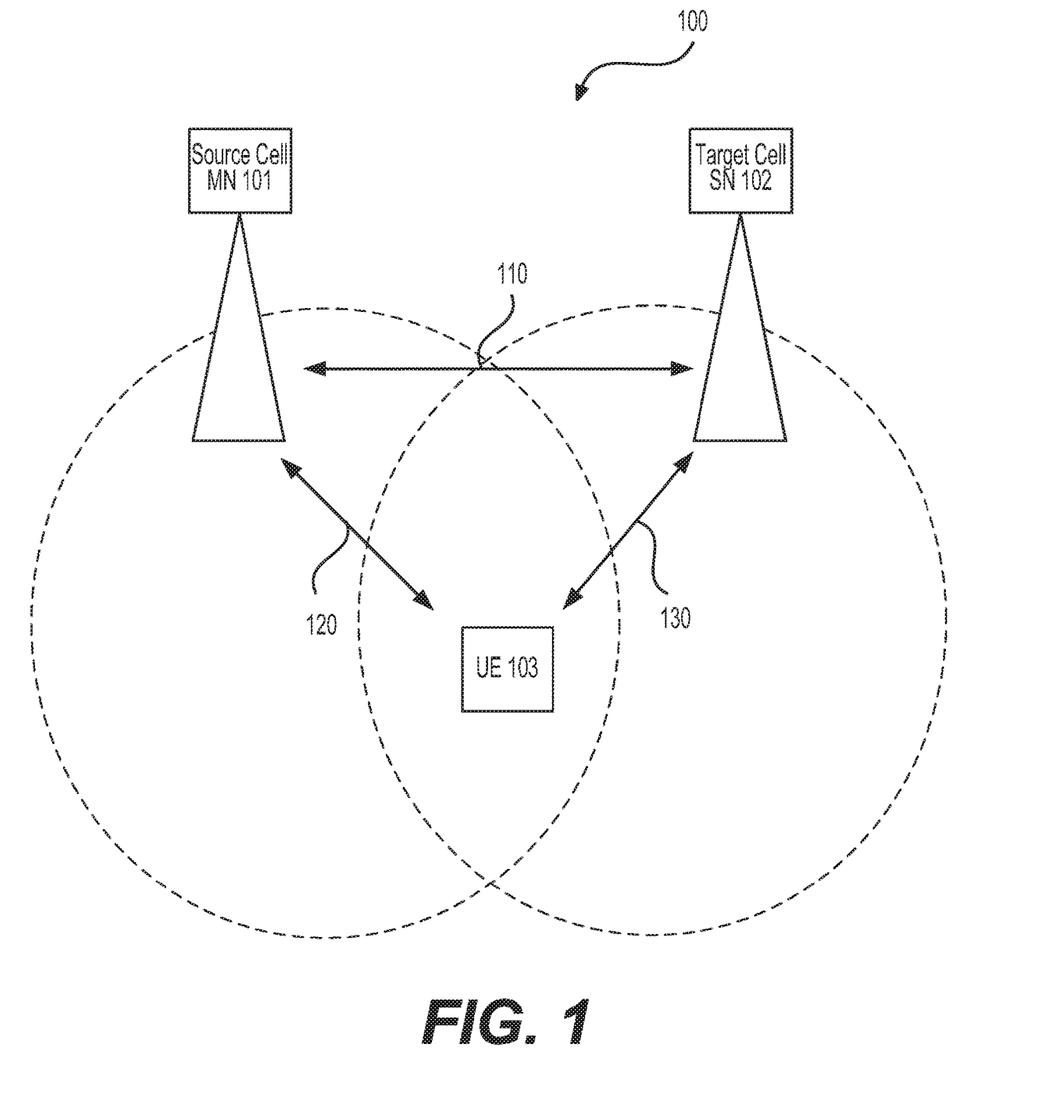
FIG. 1 shows an exemplary wireless communication system 100 performing dual connectivity operations according to an embodiment of the disclosure.

FIG. 1 shows an exemplary wireless communication system 100 performing handover (HO) operations according to an embodiment of the disclosure. During HO, a UE 103 moves across the network coverage area from a source cell 101 to a target cell 102. During break-before-make (BBM) HO procedure, the UE 103 first breaks communications with the source cell 101 and then makes communications with the target cell 102. However, due to communication 110 between the source cell 101 and the target cell 102, the UE 103 may experience a significant interruption time during the BBM HO procedure. To minimize the interruption time, the UE 103 can first make the communications with the target cell 102 and then break the communications with the source cell 101. This procedure is referred to as make-before-break (MBB) HO. In 3GPP Release 16, dual active protocol stack (DAPS) based handover (HO) is adopted to achieve as close as possible to 0 ms interruption time.

During the DAPS based HO procedure, the UE 103 can be configured with dual. connectivity (DC). With the DC configuration, the UE 103 can utilize radio resources of both a master node (MN) and a secondary node (SN). For example, the source cell 101 can serve as the MN and the target cell 102 can serve as the SN, so that the UE 103 can perform the DC operations with both the source cell 101 and the target cell 102. Under the DC operations, the source cell 101 and the target cell 102 can perform the communication 110 with each other, and the UE 103 can simultaneously perform communications 120 and 130 with the source cell 101 and the target cell 102, respectively.

It is noted that the MN (e.g., the source cell 101) and/or the SN (e.g., the target cell 102) can be implemented by an eNodeB (eNB) as specified in 3GPP LIE standards and/or a gNodeB (gNB) as specified in 3GPP NR standards. In one example, both the MN and the SN are implemented by the eNBs. In another example, both the MN and the SN are implemented by the gNBs. In another example, the MN and the SN are implemented by the eNB and the gNB, respectively. In another example, the MN and the SN are implemented by the gNB and the eNB, respectively. Accordingly, to perform DC operations, the UE 103 can use radio resources provided by either same or different radio access technologies (RATs).

Figure 2A:
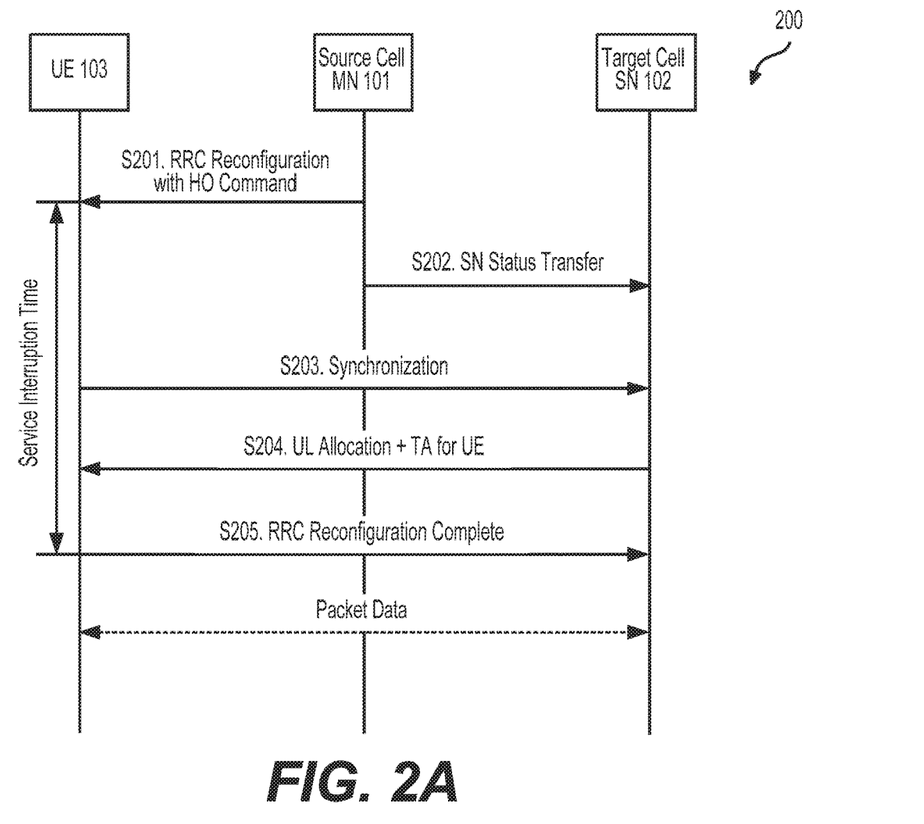
FIG. 2A shows an exemplary HO procedure 200 according to an embodiment of the disclosure.

FIG. 2A shows an exemplary HO procedure 200 according to an embodiment of the disclosure. The detailed description of the HO procedure 200 is present below.

At step S201, the UE 103 receives, from the source cell 101, RRCReconfiguration (HO command) message that request the UE 103 to perform the HO.

At step S202, the source cell 101 sends SN STATUS TRANSFER message to the target cell 102 to convey, for example, the uplink packet data convergence protocol (PDCP) sequence number (SN) receiver status and the downlink PDCP SN transmitter.

At step S203, the UE 103 performs synchronization to the target cell 102. In an example, the UE 103 can access the target cell 102 via random access channel (RACH).

At step S204, the target cell 102 responds to the UE 103 with uplink (UL) allocation and timing advance (TA).

At step S205, the UE 103 sends the RRCConnectionReconfigurationComplete message to the target cell 102 to indicate that the HO procedure is completed for the UE. Then the target cell 102 can begin sending data to the UE 103.

In the FIG. 2A example, the service interruption time during the HO procedure is defined as the interruption from reception of RRCReconfiguration (HO command) to transmission of RRCReconfigurationComplete.

Figure 2B:
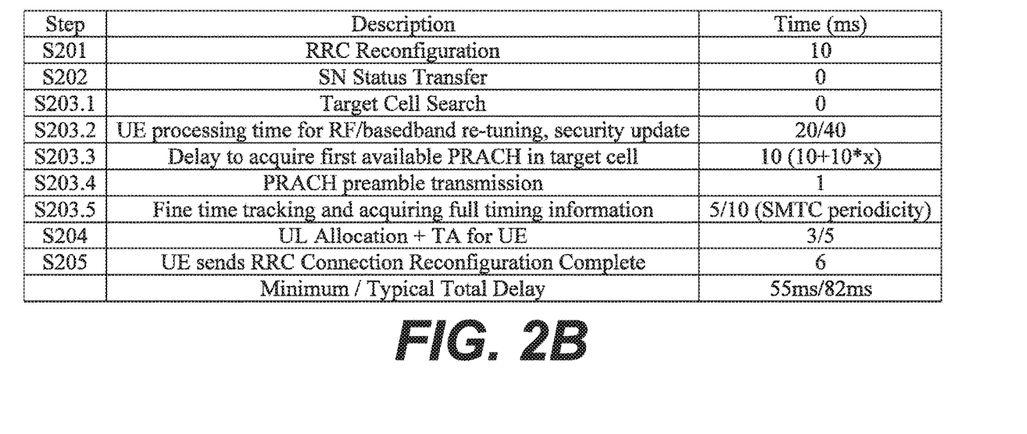
FIG. 2B shows detailed interruption time components in the HO procedure 200 according to an embodiment of the disclosure.

FIG. 2B shows detailed interruption time components in the HO procedure 200 according to an embodiment of the disclosure. It can be seen that the minimum total delay is 55 ms during the HO procedure 200. In addition, it is noted that contention free RACH is assumed for the HO procedure 200.

To reduce the service interruption time, RACH-less HO and 2-step RACH based HO have been proposed in some related examples. For RACH-less HO, the steps S203.3/S203.4/S204 are not necessary so that 14 out of 55 ms can be saved. For 2-step RACH based HO, the step S205 is not necessary so that 6 out of 55 ms can be saved. If 2-step RACH based HO is used as a baseline, RACH-less HO can save 8 out of 49 ms.

To further reduce the service interruption time and enhance the mobility, the present application presents a DC-based HO procedure.

Figure 3:
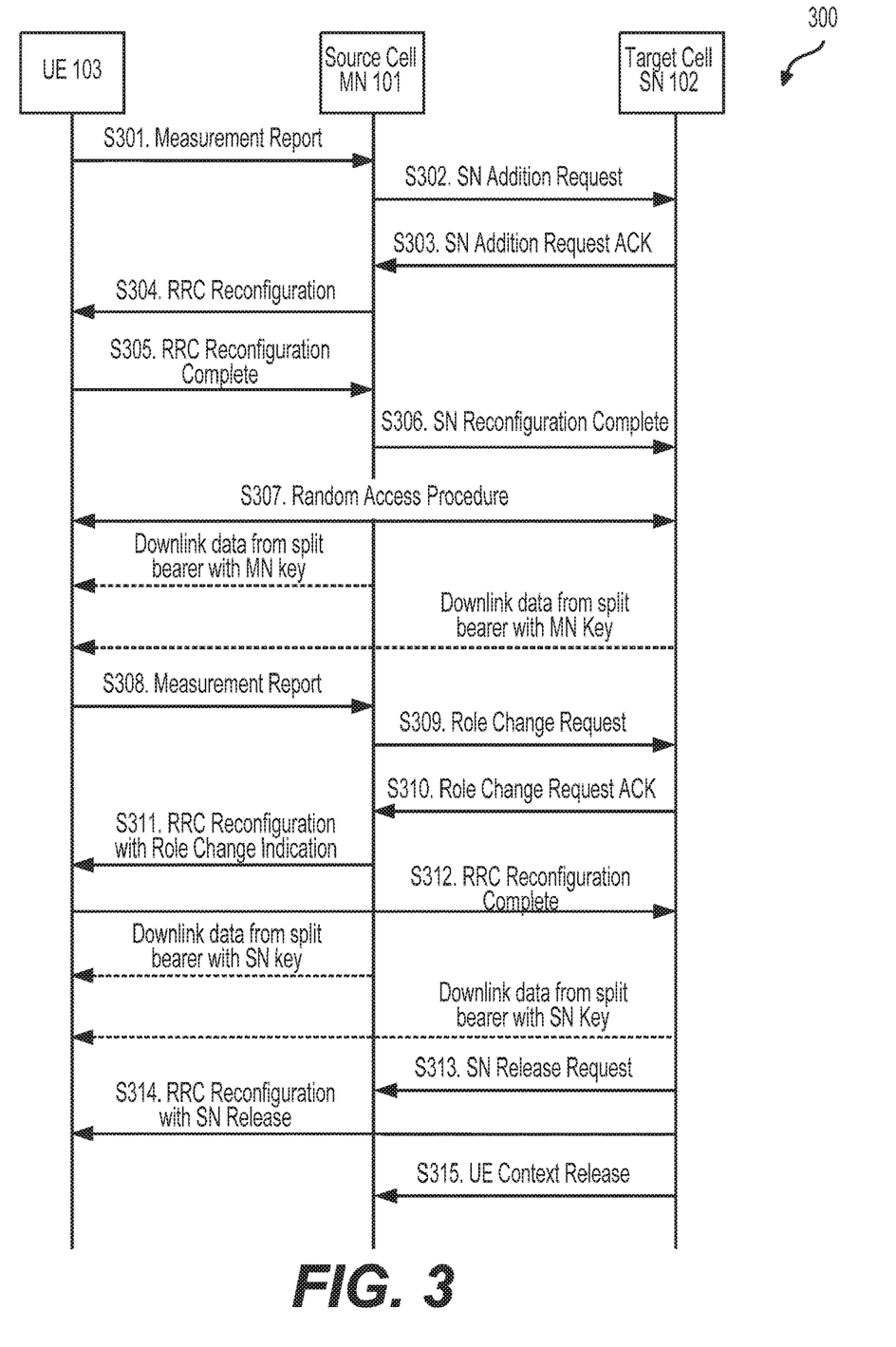
FIG. 3 shows an exemplary message flow 300 of dual connectivity (DC) based HO procedure according to an embodiment of the disclosure.

FIG. 3 shows an exemplary message flow 300 of DC-based HO procedure according to an embodiment of the disclosure. The detailed description of the message flow 300 is present below.

At step S301, the source cell 101 (i.e., the MN) receives from the UE 103 a first measurement report.

At step S302, the source cell 101 transmits to the target cell 102 an SN addition request message. In an example, the SN addition request message requests the target cell 102 to provide radio resource configuration.

At step S303, the source cell 101 receives from the target cell 102 an SN addition request acknowledgement (ACK) message. In an example, the SN addition request ACK message indicates to the source cell 101 that the SN addition request message has been received by the target cell 102.

At step S304, the source cell 101 transmits to the UE 103 a first radio resource control (RRC) reconfiguration message. In an example, the first RRC reconfiguration message indicates to the UE 103 the radio resource configuration of the target cell 102.

At step S305, the source cell 101 receives from the UE 103 a first RRC reconfiguration complete message. In an example, the first RRC reconfiguration complete message indicates to the source cell 101 that the radio resource configuration of the target cell 102 has been configured with the UE 103.

At step S306, the source cell 101 transmits to the target cell 102 an SN reconfiguration complete message. In an example, the SN reconfiguration complete message indicates to the target cell 102 that the radio resource configuration of the target cell 102 has been configured with the UE 103.

At step S307, the UE 103 synchronizes with the target cell 102 by performing random access procedure.

At step S308, the UE 103 transmits to the source cell 101 a second measurement report. Then a role change procedure can be initiated. The role change procedure is to exchange the roles of the source cell 101 and the target cell 102.

At step S309, the source cell 101 transmits to the target cell 102 a role change request message. In an example, the role change request message can trigger signaling radio bearers (SRBs) establishment in the target cell 102. The SRBs in the target cell 102 will be used instead of those in the source cell 101.

At step S310, the source cell 101 receives from the target cell 102 a role change request ACK message. In an example, the role change request ACK message indicates to the source cell 101 that the role change request message has been received by the target cell 102. The role change request ACK message can trigger SRB suspension or release in the source cell 101.

At step S311, the source cell 101 transmits to the UE 103 a second RRC reconfiguration message. The second RRC reconfiguration message indicates to the UE 103 a notification of the role change procedure and let the UE 103 perform the role change procedure.

At step S312, the target cell 102 receives from the UE 103 a second RRC reconfiguration complete message. In an example, the second RRC reconfiguration complete message indicates to the target cell 102 that the notification of the role change procedure is received by the UE 103.

At step S313, the source cell 101 receives from the target cell 102 an SN release request message. In an example, the SN release request message requests the source cell 101 to release radio resources.

At step S314, the target cell 102 transmits to the UE 103 a third RRC reconfiguration message. In an example, the third RRC reconfiguration message triggers the UE 103 to apply new configuration.

At step S315, the target cell 102 transmits to the source cell 101 a UE context release message. In an example, on reception of the UE context release message, the source cell 101 can release radio resource related to the UE context.

Figure 4:
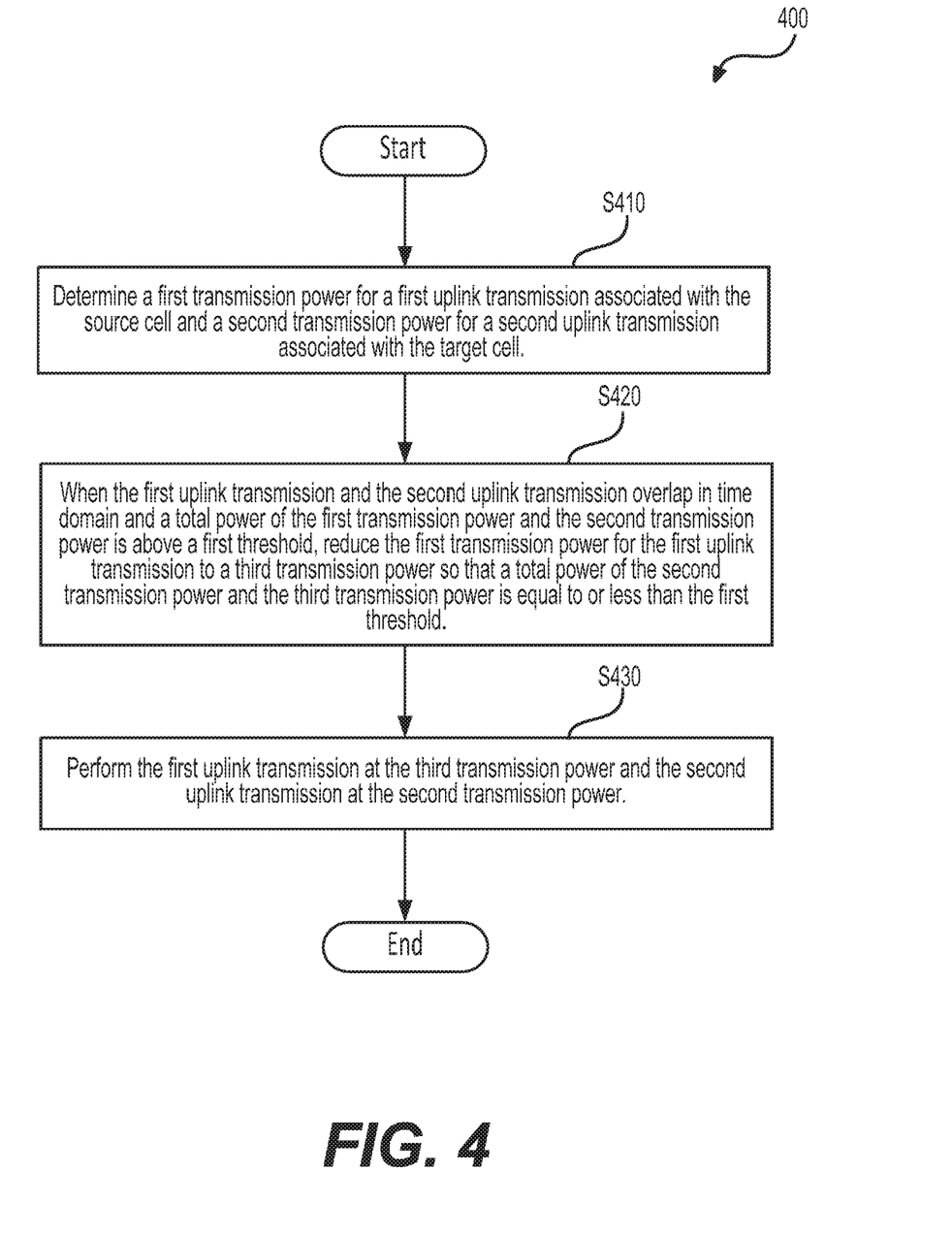
FIG. 4 shows a flowchart outlining an exemplary process 400 according to embodiments of the disclosure.

FIG. 4 shows a flowchart outlining an exemplary process 400 according to embodiments of the disclosure. In various embodiments, the process 400 is executed by processing circuitry, such as the processing circuitry in the UE 103. In some embodiments, the process 400 is implemented in software instructions, thus when the processing circuitry executes the software instructions, the processing circuitry performs the process 400.

The process 400 may generally start at step S410, where the process 400 determines a first transmission power for a first uplink transmission associated with the source cell and a second transmission power for a second uplink transmission associated with the target cell. When the first uplink transmission and the second uplink transmission overlap in time domain and a total power of the first transmission power and the second transmission power is above a first threshold, the process 400 proceeds to step S420.

At step S420, the process 400 reduces the first transmission power for the first uplink transmission to a third transmission power so that a total power of the second transmission power and the third transmission power is equal to or less than the first threshold. Then the process 400 proceeds to step S430.

At step S430, the process 400 performs the first uplink transmission at the third transmission power and the second uplink transmission at the second transmission power. Then the process 400 terminates.

In an embodiment, the process 400 drops the first uplink transmission associated with the source cell when a difference between the second transmission power and the third transmission power is above a second threshold.

In an embodiment, the process 400 drops the first uplink transmission associated with the source cell when the first uplink transmission and the second uplink transmission overlap in the time domain and frequency domain.

In an embodiment, the process 400 performs the first uplink transmission at the first transmission power and the second uplink transmission at the second uplink transmission power through different time resources so that the first uplink transmission and the second uplink transmission do not overlap in the time domain.

In an embodiment, the source cell is in a source master cell group (MCG) and the target cell is in a target MCG.

In an embodiment, the UE 103 supports dual active protocol stack (DAPS) based handover (HO), and the process 400 drops the first uplink transmission associated with the source cell when the UE 103 indicates that simultaneous uplink transmission to the source cell and the target cell is not supported.

Figure 5:
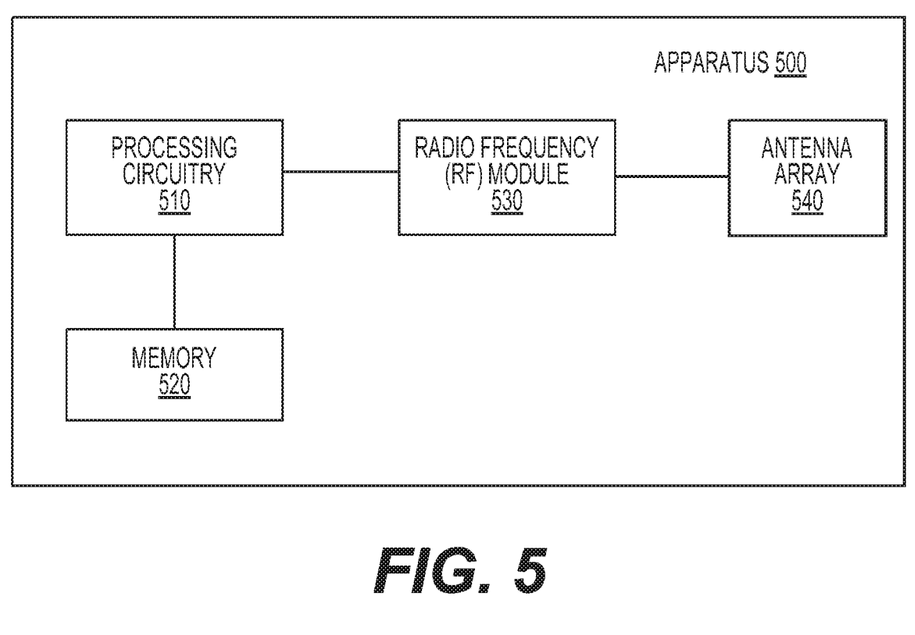
FIG. 5 shows an exemplary apparatus 500 according to embodiments of the disclosure.

FIG. 5 shows an exemplary apparatus 500 according to embodiments of the disclosure. The apparatus 500 can be configured to perform various functions in accordance with one or more embodiments or examples described herein. Thus, the apparatus 500 can provide means for implementation of techniques, processes, functions, components, and systems described herein. For example, the apparatus 500 can be used to implement functions of the BS 103 in various embodiments and examples described herein. The apparatus 500 can include a general purpose processor or specially designed circuits to implement various functions, components, or processes described herein in various embodiments. The apparatus 500 can include processing circuitry 510, a memory 520, a radio frequency (RF) module 530, and an antenna array 540.

In various examples, the processing circuitry 510 can include circuitry configured to perform the functions and processes described herein in combination with software or without software. In various examples, the processing circuitry 510 can be a digital signal processor (DSP), an application specific integrated circuit (ASIC), programmable logic devices (PLDs), field programmable gate arrays (FPGAs), digitally enhanced circuits, or comparable device or a combination thereof.

In some other examples, the processing circuitry 510 can be a central processing unit (CPU) configured to execute program instructions to perform various functions and processes described herein. Accordingly, the memory 520 can be configured to store program instructions. The processing circuitry 510, when executing the program instructions, can perform the functions and processes. The memory 520 can further store other programs or data, such as operating systems, application programs, and the like. The memory 520 can include a read only memory (ROM), a random access memory (RAM), a flash memory, a solid state memory, a hard disk drive, an optical disk drive, and the like.

The RF module 530 receives a processed data signal from the processing circuitry 510 and converts the data signal to a wireless signal that is then transmitted via the antenna array 540, or vice versa. The RF module 530 can include a digital to analog convertor (DAC), an analog to digital converter (ADC), a frequency up convertor, a frequency down converter, filters and amplifiers for reception and transmission operations. The RF module 530 can include multi-antenna circuitry for beamforming operations. For example, the multi-antenna circuitry can include an uplink spatial filter circuit, and a. downlink spatial filter circuit for shifting analog signal phases or scaling analog signal amplitudes.

The apparatus 500 can optionally include other components, such as input and output devices, additional or signal processing circuitry, and the like. Accordingly, the apparatus 500 may be capable of performing other additional functions, such as executing application programs, and processing alternative communication protocols.

The processes and functions described herein can be implemented as a computer program which, When executed by one or more processors, can cause the one or more processors to perform the respective processes and functions. The computer program may be stored or distributed on a suitable medium, such as an optical storage medium or a solid-state medium supplied together with, or as part of, other hardware. The computer program may also be distributed in other forms, such as via the Internet or other wired or wireless telecommunication systems. For example, the computer program can be obtained and loaded into an apparatus, including obtaining the computer program through physical medium or distributed system, including, for example, from a server connected to the Internet.

The computer program may be accessible from a computer-readable medium providing program instructions for use by or in connection with a computer or any instruction execution system. The computer readable medium may include any apparatus that stores, communicates, propagates, or transports the computer program for use by or in connection with an instruction execution system, apparatus, or device. The computer-readable medium can be magnetic, optical, electronic, electromagnetic, infrared, or semiconductor system (or apparatus or device) or a propagation medium. The computer-readable medium may include a computer-readable non-transitory storage medium such as a semiconductor or solid state memory, magnetic tape, a removable computer diskette, a random access memory (RAM), a read-only memory (ROM), a magnetic disk and an optical disk, and the like.

The computer-readable non-transitory storage medium can include different types of computer readable medium, including magnetic storage medium, optical storage medium, flash medium, and solid state storage medium.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method of wireless communication at a user equipment (UE) that connects to both a source cell and a target cell, the method comprising:
   determining a first transmission power for a first uplink transmission associated with the source cell and a second transmission power for a second uplink transmission associated with the target cell;
   when the first uplink transmission and the second uplink transmission overlap in time domain and a total power of the first transmission power and the second transmission power is above a first threshold,
      reducing the first transmission power for the first uplink transmission to a third transmission power so that a total power of the second transmission power and the third transmission power is equal to or less than the first threshold;
   performing the first uplink transmission at the third transmission power and the second uplink transmission at the second transmission power based on a difference between the second transmission power and the third transmission power not being above a second threshold; and
   dropping the first uplink transmission associated with the source cell based on the difference between the second transmission power and the third transmission power being above the second threshold.

2. The method of claim 1, wherein the dropping further comprises:
   dropping the first uplink transmission associated with the source cell when the first uplink transmission and the second uplink transmission overlap in the time domain and frequency domain.

3. The method of claim 1, further comprising:
   performing the first uplink transmission at the first transmission power and the second uplink transmission at the second uplink transmission power through different time resources so that the first uplink transmission and the second uplink transmission do not overlap in the time domain.

4. The method of claim 1, wherein the source cell is in a source master cell group (MCG) and the target cell is in a target MCG.

5. The method of claim 1, wherein the UE supports dual active protocol stack (DAPS) based handover (HO).

6. The method of claim 5, further comprising:
   dropping the first uplink transmission associated with the source cell when the UE indicates that simultaneous uplink transmission to the source cell and the target cell is not supported.

7. An apparatus that wireless connects to both a source cell and a target cell, the apparatus comprising processing circuitry configured to:
   determine a first transmission power for a first uplink transmission associated with the source cell and a second transmission power for a second uplink transmission associated with the target cell;
   when the first uplink transmission and the second uplink transmission overlap in time domain and a total power of the first transmission power and the second transmission power is above a first threshold,
      reduce the first transmission power for the first uplink transmission to a third transmission power so that a total power of the second transmission power and the third transmission power is equal to or less than the first threshold;
   perform the first uplink transmission at the third transmission power and the second uplink transmission at the second transmission power based on a difference between the second transmission power and the third transmission power not being above a second threshold; and
   dropping the first uplink transmission associated with the source cell based on the difference between the second transmission power and the third transmission power being above the second threshold.

8. The apparatus of claim 7, wherein the processing circuitry is further configured to:

drop the first uplink transmission associated with the source cell when the first uplink transmission and the second uplink transmission overlap in the time domain and frequency domain.

9. The apparatus of claim 7, wherein the processing circuitry is further configured to:
perform the first uplink transmission at the first transmission power and the second uplink transmission at the second uplink transmission power through different time resources so that the first uplink transmission and the second uplink transmission do not overlap in the time domain.

10. The apparatus of claim 7, wherein the source cell is in a source master cell group (MCG) and the target cell is in a target MCG.

11. The apparatus of claim 7, wherein the processing circuitry is further configured to:
perform dual active protocol stack (DAPS) based handover (HO).

12. The apparatus of claim 11, wherein the processing circuitry is further configured to:
drop the first uplink transmission associated with the source cell when the UE indicates that simultaneous uplink transmission to the source cell and the target cell is not supported.

13. A non-transitory computer-readable storage medium storing a program executable by at least one processor to perform:
determining a first transmission power for a first uplink transmission associated with a source cell and a second transmission power for a second uplink transmission associated with a target cell;
when the first uplink transmission and the second uplink transmission overlap in time domain and a total power of the first transmission power and the second transmission power is above a first threshold,
reducing the first transmission power for the first uplink transmission to a third transmission power so that a total power of the second transmission power and the third transmission power is equal to or less than the first threshold;
performing the first uplink transmission at the third transmission power and the second uplink transmission at the second transmission power based on a difference between the second transmission power and the third transmission power not being above a second threshold; and
dropping the first uplink transmission associated with the source cell based on the difference between the second transmission power and the third transmission power being above the second threshold.

14. The non-transitory computer-readable storage medium of claim 13, wherein the stored program executable by the at least one processor is further to perform:
dropping the first uplink transmission associated with the source cell when the first uplink transmission and the second uplink transmission overlap in the time domain and frequency domain.

15. The non-transitory computer-readable storage medium of claim 13, wherein the stored program executable by the at least one processor is further to perform:
executing the first uplink transmission at the first transmission power and the second uplink transmission at the second uplink transmission power through different time resources so that the first uplink transmission and the second uplink transmission do not overlap in the time domain.

16. The non-transitory computer-readable storage medium of claim 13, wherein the source cell is in a source master cell group (MCG) and the target cell is in a target MCG.

17. The non-transitory computer-readable storage medium of claim 13, wherein the stored program executable by the at least one processor is further to perform:
executing a dual active protocol stack (DAPS) based handover (HO).

* * * * *